US011425436B2

(12) United States Patent
Koontz, III

(10) Patent No.: US 11,425,436 B2
(45) Date of Patent: Aug. 23, 2022

(54) STREAMING SERVER SHARING MEDIA SOURCE LOCATIONS WITH OVER-AIR SERVER

(71) Applicant: iHeartMedia Management Services, Inc., San Antonio, TX (US)

(72) Inventor: John D. Koontz, III, Baton Rouge, LA (US)

(73) Assignee: iHeartMedia Management Services, Inc., San Antonio, TX (US)

( * ) Notice: Subject to any disclaimer, the term of this patent is extended or adjusted under 35 U.S.C. 154(b) by 0 days.

(21) Appl. No.: 17/218,433

(22) Filed: Mar. 31, 2021

(65) Prior Publication Data
US 2021/0243486 A1     Aug. 5, 2021

Related U.S. Application Data

(63) Continuation of application No. 16/162,499, filed on Oct. 17, 2018, now Pat. No. 10,972,774, which is a continuation of application No. 15/876,515, filed on Jan. 22, 2018, now Pat. No. 10,110,938, which is a continuation of application No. 15/133,802, filed on
(Continued)

(51) Int. Cl.
| H04N 21/222 | (2011.01) |
|---|---|
| H04N 21/242 | (2011.01) |
| H04N 21/2665 | (2011.01) |
| H04N 21/61 | (2011.01) |

(Continued)

(52) U.S. Cl.
CPC .......... *H04N 21/242* (2013.01); *H04H 20/18* (2013.01); *H04N 21/2221* (2013.01); *H04N 21/2665* (2013.01); *H04N 21/6175* (2013.01); *H04N 21/812* (2013.01)

(58) Field of Classification Search
CPC . H04N 21/242; H04N 21/2665; H04N 21/266
See application file for complete search history.

(56) References Cited

U.S. PATENT DOCUMENTS

| 6,470,049 | B1 | 10/2002 | Nguyen |
| 7,584,491 | B2 | 9/2009 | Bruckner |

(Continued)

*Primary Examiner* — Hsiungfei Peng
*Assistant Examiner* — Fred Peng
(74) *Attorney, Agent, or Firm* — Garlick & Markison; Edward J. Marshall

(57) ABSTRACT

An over-air media server obtains first media content, including external content stored in a location external to the over-air media server, and delivers it for broadcast via on-air broadcast chain. A streaming media server is in communication with the over-air media server and a streaming broadcast chain. The streaming media server operates in a synchronized mode, during which it delivers, under control of the over-air media server, second media content to a streaming broadcast chain. The streaming server transitions from the synchronized mode to an independent mode, during which it delivers the second media content to the streaming broadcast chain independent of control by over-air media server. While operating in the independent mode the streaming media server obtains the second media content, including obtaining external content, from the same location from which over-air media server obtains its external content. The second media content is delivered to the streaming broadcast chain independent of control by the over-air media server.

20 Claims, 3 Drawing Sheets

Related U.S. Application Data

Apr. 20, 2016, now Pat. No. 9,894,395, which is a continuation of application No. 14/100,649, filed on Dec. 9, 2013, now Pat. No. 9,326,013, which is a continuation of application No. 12/633,346, filed on Dec. 8, 2009, now Pat. No. 8,607,292.

(51) Int. Cl.
*H04N 21/81* (2011.01)
*H04H 20/18* (2008.01)

(56) References Cited

U.S. PATENT DOCUMENTS

| | | |
|---|---|---|
| 8,312,504 B2 | 11/2012 | Carlucci |
| 8,332,885 B2 | 12/2012 | Williamson |
| 8,413,183 B2 | 4/2013 | Kunkel |
| 2002/0166120 A1 | 11/2002 | Boylan |
| 2006/0212346 A1 | 9/2006 | Brazell |
| 2008/0122986 A1 | 5/2008 | Diederichsen |
| 2008/0187003 A1 | 8/2008 | Becker |
| 2011/0138411 A1 | 6/2011 | Koontz, III |
| 2012/0051543 A1* | 3/2012 | Evans ............... H04N 21/4385 380/270 |

* cited by examiner

STREAMING SERVER SHARING MEDIA SOURCE LOCATIONS WITH OVER-AIR SERVER

CROSS REFERENCE TO RELATED PATENTS

The present U.S. Utility patent application claims priority pursuant to 35 U.S.C. § 120 as a continuation of U.S. Utility application Ser. No. 16/162,499, entitled "BROADCAST SYNCHRONIZATION", filed Oct. 17, 2018, scheduled to issue as U.S. Pat. No. 10,972,774 on Apr. 6, 2021, which is a continuation of U.S. Utility application Ser. No. 15/876,515, entitled "BROADCAST SYNCHRONIZATION", filed Jan. 22, 2018, now U.S. Pat. No. 10,110,938, which is a continuation of U.S. Utility application Ser. No. 15/133,802, entitled "BROADCAST SYNCHRONIZATION", filed Apr. 20, 2016, now U.S. Pat. No. 9,894,395, which is a continuation of U.S. Utility application Ser. No. 14/100,649, entitled "BROADCAST SYNCHRONIZATION", filed Dec. 9, 2013, now U.S. Pat. No. 9,326,013, which is a continuation of U.S. Utility application Ser. No. 12/633,346, entitled "BROADCAST SYNCHRONIZATION," filed Dec. 8, 2009, now U.S. Pat. No. 8,607,292, all of which are hereby incorporated herein by reference in their entirety and made part of the present U.S. Utility patent application for all purposes.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

Technical Field of the Invention

The present disclosure relates generally to broadcasting, and more particularly to a streaming server sharing media source locations with an over-air server.

Description of Related Art

Radio, television, satellite, and other broadcasters often devote a significant amount of time and effort to scheduling media content and spots for broadcast. In some circumstances, the same content is delivered for broadcast over two different media channels, for example when a radio station broadcasts media content over the air, and streams the same media content via an Internet radio station. In some cases, even though both stations are broadcasting the same programming content, commercials, or spots, broadcast during particular spot blocks, may vary between stations. Broadcasting different spots during a common spot block can greatly increase the complexity involved in scheduling spots. It can also be difficult to make sure that the length of the spot blocks on both of the stations remain consistent, and that the spot blocks remain synchronized. Conventional technologies do not always provide the most effective way to handle the scheduling and synchronization issues that can arise in various broadcasting situations.

SUMMARY

Various embodiments of the present disclosure can be implemented as a system that includes a first media server configured to deliver media content for broadcast via a first media channel, and a second media server configured to deliver media content for broadcast via a second media channel. The first media server can be configured to operate during a first portion of time in a synchronized mode at least partially under control of the second media server, and independently of the second media server during a second portion of time, in an independent mode. The first media server can be configured so that during operation in the independent mode, spots are delivered unconstrained by a spot block schedule used by the second media server. In some embodiments, during operation in the independent mode, the first media server is configured to operate in accordance with a copy of a clock shell associated with the second server.

Some embodiments can be implemented as a method that includes executing, on a first media server, an instruction to exit an independent mode and operate in a synchronized mode. During operation in the synchronized mode, the first media server, operating at least partially under control of a second media server, delivers first media content for broadcast via a first media channel. The second media server operates to deliver the first media content for broadcast via a second media channel. An instruction to exit the synchronized mode and operate in the independent mode can also be executed on the first media server. During operation in the independent mode, the first media server can operate independently of the second media server to deliver second media content for broadcast via the first media channel. In various embodiments, during operation in the independent mode, the first media server delivers spots unconstrained by a spot block schedule used by the second media server. In some implementations, during the independent mode, the first server can operate in accordance with a copy of a clock shell associated with the second server.

Furthermore, some embodiments can be implemented as a media server that includes at least one processor, memory operably associated with the processor, and a program of computer readable instructions to be stored in the memory and executed by the processor. The program of instruction can include at least one instruction to exit an independent mode and operate in a synchronized mode at least partially under control of a second media server. The second media server can deliver the first media content for broadcast via a second media channel. The program of instructions can also include one or more instructions to be executed during operation in the synchronized mode to deliver first media content for broadcast, via a first media channel, and one or more instructions to exit the synchronized mode and operate in the independent mode. Additionally, one or more instructions can be included for execution during operation in the independent mode. Then at least one instruction can be executed to deliver, independently of the second media server, second media content for broadcast via the first media channel. Instructions can also be included, for execution during operation in the independent mode, to deliver spots unconstrained by a spot block schedule used by the second media server, and to cause the media server to operate in accordance with a copy of a clock shell associated with another server.

Aspects of this disclosure will become apparent upon reading the following detailed description and upon reference to the accompanying drawings, in which like references may indicate similar elements:

BRIEF DESCRIPTION OF THE SEVERAL VIEWS OF THE DRAWING(S)

DETAILED DESCRIPTION OF THE INVENTION

The following is a detailed description of embodiments of the disclosure depicted in the accompanying drawings. The embodiments are presented in sufficient detail to clearly communicate the disclosure to one of ordinary skill in the art. However, the amount of detail offered is not intended to limit the anticipated variations of embodiments; on the contrary, the intention is to cover all modifications, equivalents, and alternatives falling within the spirit and scope of the present disclosure as defined by the appended claims.

Figure 1:
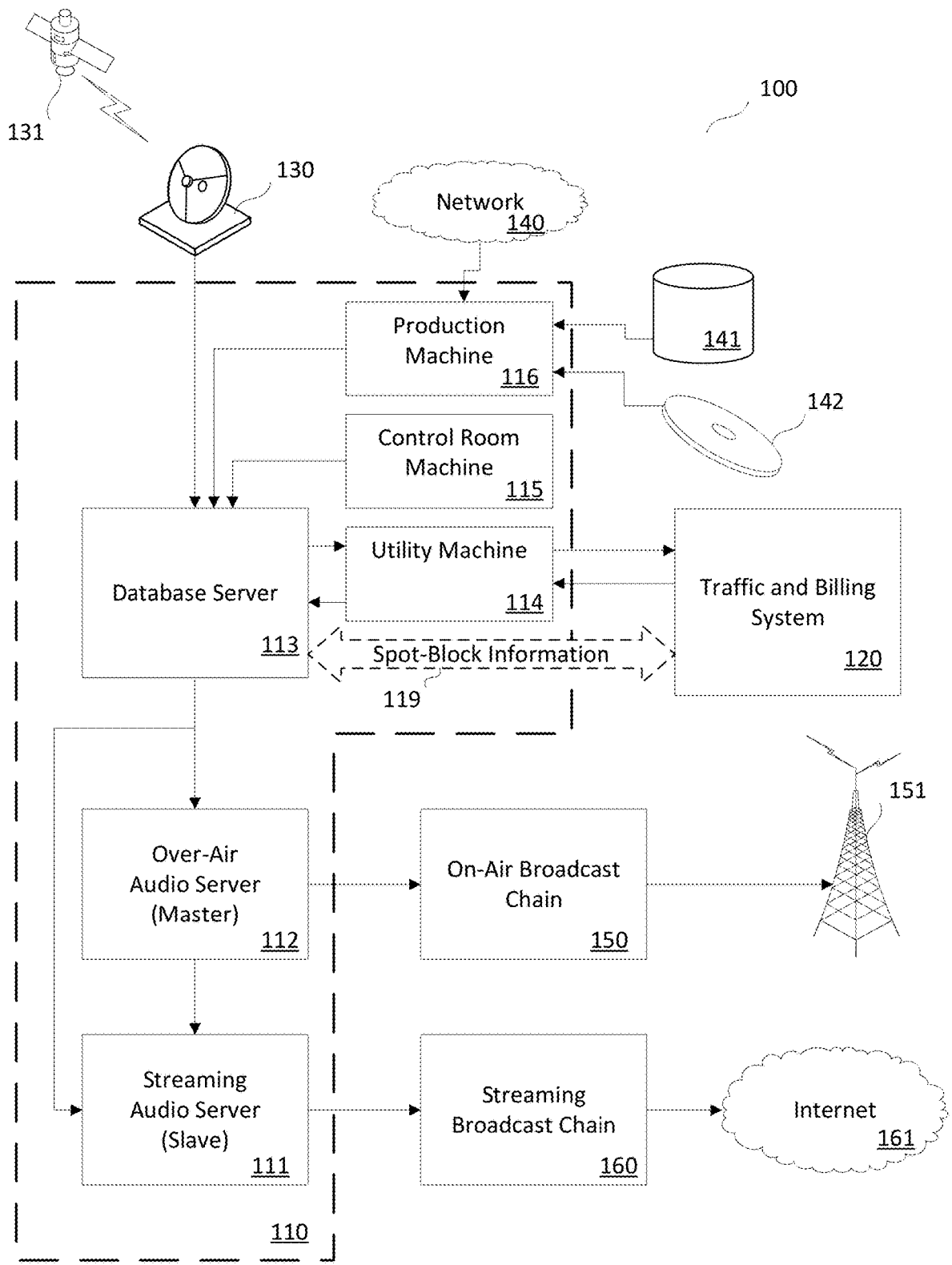
FIG. 1 is a block diagram illustrating a system including a media server configured to operate in both synchronized and independent modes, according to various embodiments of the present disclosure.

Referring first to FIG. 1, a system 100 according to various embodiments of the present disclosure will be discussed. System 100 includes media automation system 110, which can be used to control and automate various media broadcast functions; and traffic and billing system 120, which is used to provide control for various traffic and billing functions such as entering and editing orders, and scheduling spots. System 100 also includes streaming broadcast chain 160, through which a streaming broadcast of media content can be provided to a network such as Internet 161; on air broadcast chain 150, through which media content can be broadcast via a broadcast tower 151 or otherwise; and various media sources such as an individual source media 142, bulk media storage such as database 141, programming from another market received via network 140, and programming broadcast via satellite 131 received via satellite receiver 130.

Media automation system 110 includes production machine 116, which receives media content from network 140, database 141, individual source media 142; control room machine 115, and utility machine 114, each of which is connected to database server 113. Media automation system 110 also includes over-air audio server 112, which provides media content to on air broadcast chain 150; and streaming audio server 111, which provides audio content to streaming broadcast chain 160. Database server 113 can provide content to one or both of over-air audio server 112 and streaming audio server 111. In at least one embodiment, one or more of the illustrated servers can be implemented as virtual servers implemented on the same hardware as another of the illustrated servers. Furthermore, various distributed processing techniques can be used to spread functionality of one or more of the illustrated servers across multiple different machines.

In some embodiments, media automation system 110 can be, for example, a radio automation system used to control media content broadcast via multiple different radio stations in a single market, with some or all system elements and subsystems co-located in a single physical facility. In other embodiments, media automation system 110 can be a radio automation system used to provide control of radio stations in different markets, in different locations, or via different distribution channels. In an illustrated embodiment, media automation system 110 is used to control media broadcast over the air via on-air broadcast chain 150 and broadcast tower 151, and streaming media provided to the Internet 161 via streaming broadcast chain 160. Broadcast stations and delivery media in addition to those illustrated in FIG. 1 can also be controlled by media automation system 110. It should be appreciated that media automation system 110 can also be used with television and other types of media that may broadcast programming via multiple different stations or outlets.

In at least one embodiment, over-air audio server 112 acts as a master audio server, and streaming audio server 111 assumes the role of a slave audio server, when operating in a synchronized mode. During synchronized mode, over-air audio server 112 can exert control over the content and timing of media and spots served by streaming audio server 111, so that, for example, spot blocks are broadcast beginning and ending at the same time on both the over-air channel served by over-air audio server 112, and the streaming channel served by streaming audio server 111. In at least one embodiment, synchronized mode can be used for live programs, e.g. news, talk and live local shows on music stations, and satellite delivered programs that have fixed spot length spot breaks.

At other times, streaming audio server 111 operates in an independent mode, during which over-air audio server 112 does not strictly control the media delivery by streaming audio server 111. For example, during independent mode, streaming audio server 111 can deliver for broadcast content scheduled in accordance with a copy of the same clock shell used by over-air audio server 112, but within the constraints of the clock shell in some embodiments, streaming audio server 111 is free to re-order, modify, or substitute media content and spots. In some embodiments, streaming audio server 111 can deliver the same or similar content for broadcast as that being delivered by over-air audio server 112, but the timing, length, and content of spot blocks used by streaming audio server 111 can be modified and broadcast independently of spot block content, length, and timing used by over-air audio server 112.

In some embodiments, prior to switching from the synchronized mode to the independent mode, or as part of the process of entering the independent mode, external content currently mapped to over-air audio server 112 is also mapped to streaming audio server 111. Music logs for streaming audio server 111 can be pointed to the same folder used by over-air audio server 112, and over-air audio server 112 can be mapped to transmit local voice tracks to streaming audio server 111. Additionally, one or more terrestrial clocks used by over-air server 112 can be copied to streaming audio server 111.

Media automation system 110 can obtain media to be broadcast from various sources. For example, production machine 116 can obtain information from broadcasts in other markets via network 140. Production machine 116 can also obtain media from database 141, which may be a database local to production machine 116, or local to another server or machine that is part of media automation system 110. In other embodiments, database 141 can be maintained by a third-party media provider, which can be remote from media automation system 110. Production machine 116 can also obtain media to be broadcast from individual media sources, such individual source media 142, which may include any of various non-volatile media storage elements, including but not limited to optical disks, e.g. compact discs (CDs), digital video disks (DVDs), various types of magnetic and electromagnetic storage media, or the like.

Production machine 116 can provide some or all of the media to be broadcast to database server 113. In addition to the media provided to database server 113 from production machine 116, satellite receiver 130 can also provide satellite content to be inserted into a broadcast via over-air audio server 112 and streaming audio server 111. Database server 113 can also receive media or other content to be broadcast from control room machine 115. Control room machine 115 may include a studio in which a live broadcast is being generated, such as a talk show or other similar live program, but control room machine 115 can also provide media to database server 113 other than live media.

In general, traffic and billing system 120 can be used to provide control and monitoring of the sale and scheduling of spots, and to determine which spots are to be played on which stations at particular times. This information can be provided in the form of a log file, or otherwise. Media automation system 110 can use database server 113 to gather programming and media information from various sources, and combine that information with spot block information 119 to generate a log file indicating a substantially complete representation of which media and spots are to be broadcast. The log file and related information can be provided to both over-air audio server 112 and streaming audio server 111 for broadcast over their respective chains.

When operating in synchronized mode, both over-air audio server 112 and streaming audio server 111 can operate using the same log file in some embodiments. In other embodiments, over-air audio server 112 and streaming audio server 111 can use log files including the same programming or media content, with synchronized spot blocks, even though different spots may be delivered for broadcast within these synchronized spot blocks. When operating in an independent mode, streaming audio server 111 may operate according to a different log file than the log file used by over-air audio server 112, or operate according to a similar log file, but without being constrained by the spot breaks associated with over-air audio server 112.

In at least some embodiments, when operating according to different log files, the log file used by streaming audio server 111 can be generated based on the same clock shell used to generate the log file used by over-air audio server 112. In some such embodiments, this results in over-air audio server 112 and streaming audio server 111 delivering similar, although not identical, programming, with spot blocks delivered by streaming audio server 111 being unconstrained by a spot block schedule used by over-air audio server 112. In at least some embodiments, during independent mode, the clock shell used by streaming audio server 111 is periodically synchronized with the clock shell used by over-air audio server 112. Synchronizing the clock shells does not necessarily synchronize the specific programming, media content, or spots, delivered by over-air audio server 112 and streaming audio server 111 for broadcast via their respective media channels. Synchronizing the clock shells does, however, provide a way for streaming audio server 111 to smooth the transition between independent mode and synchronized mode.

It will be appreciated that various systems can be used to implement the teachings set forth herein, and are not limited to the systems discussed with reference to FIG. 1. For example, although at least one embodiment includes separate traffic and billing systems, similar functionality can be provided using a single, integrated system, or a system having one or more local or distributed processing, storage and communication elements. Thus, although embodiments including automation and traffic systems are primarily discussed herein, other embodiments can be implemented.

Although reference is made specifically to over-air and streaming audio servers, other types of media servers can be used to implement the teachings set forth herein. For example, system 100 can include multiple over-air audio servers 112, multiple streaming audio servers 111, or a combination thereof. Any of the audio servers can be configured to act as a master audio server, with one or more of any remaining audio servers configured to perform in the slave audio server role. Furthermore, the teachings set forth herein are not limited to audio servers, and discussion of a specific example should not be construed to limit this disclosure to only the specifically disclosed embodiments. In some embodiments, for example, video, mixed audio and video, or other media servers can be used to provide media content and spots for broadcast over any suitable media channel. These media channels include, but are not limited to, satellite, television, Internet, and radio.

Figure 2:
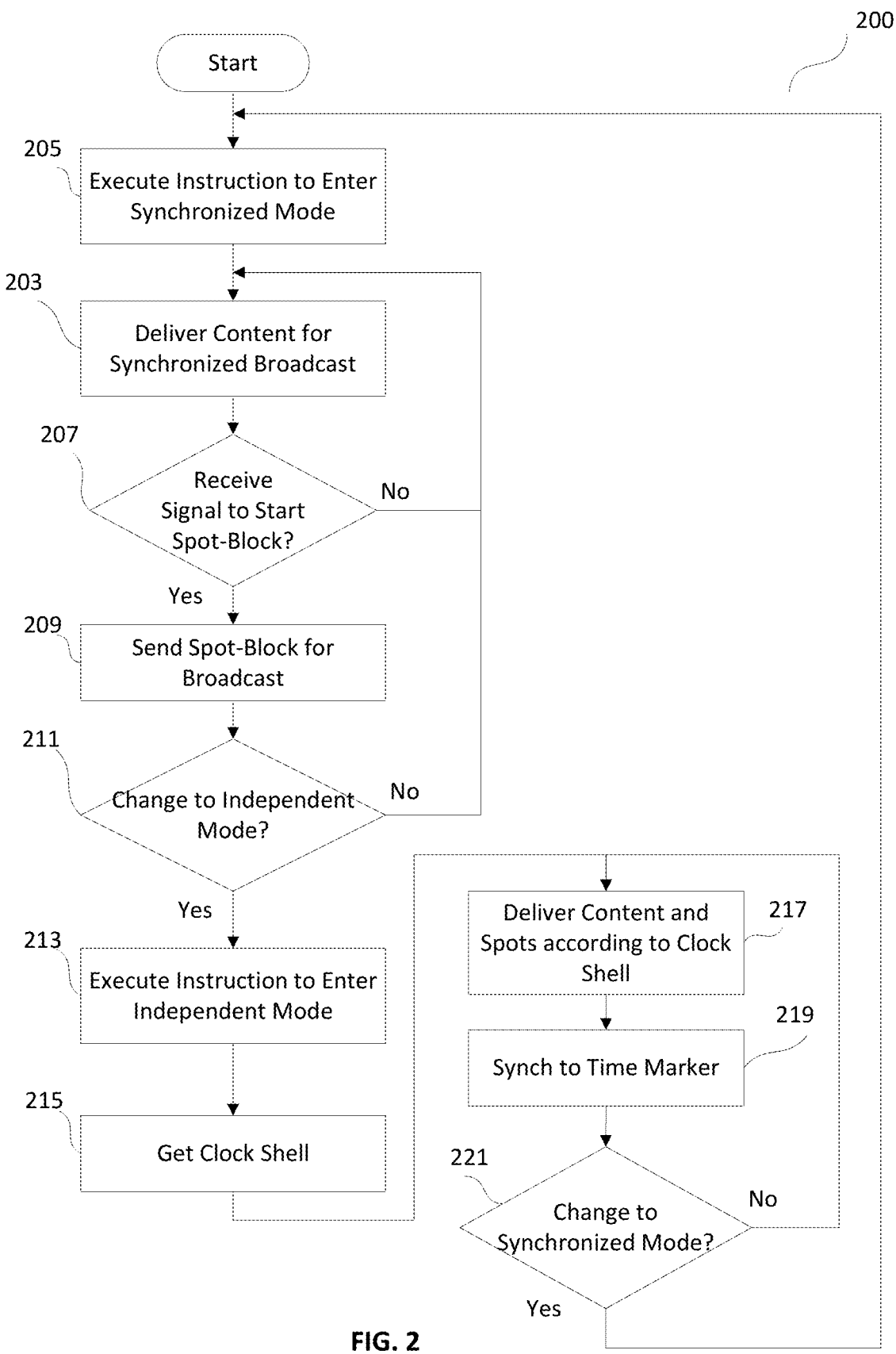
FIG. 2 is a flow chart illustrating a method of using a media server according to various embodiments of the present disclosure.

Referring next to FIG. 2, a method 200 for use in changing between a synchronized mode and an independent mode is illustrated according to various embodiments of the present disclosure. As illustrated by block 205, a media server executes an instruction to enter a synchronized mode. This instruction can be a macro or other instruction executed by a dual-mode media server, such as a streaming audio server, currently operating in an independent mode. By executing the instruction to enter a synchronized mode, the dual-mode media server can be configured to operate at least partially under control of another media server, sometimes referred to as the master media server.

The master media server may also execute an instruction to enter or leave the synchronized mode (not illustrated). However, in at least one embodiment, the master media server need not change modes, but can continue to send commands and instructions to the dual-mode media server, regardless of the mode in which the dual-mode media server is currently operating. In some such embodiments, the dual-mode media server can simply ignore any commands received from the master media server when operating in an independent mode, but follow instructions and commands when operating in a synchronized mode.

As illustrated by block 203, when operating in a synchronized mode, the dual-mode media server delivers content for substantially synchronized broadcast with content being broadcast on another media channel associated with a master audio server. For example, programming and media content delivered by the dual-mode media server for broadcast via an Internet streaming radio station, can be a least partially controlled by the master audio server, which can deliver the same programming and media content via conventional radio transmission. In some embodiments, even if the programming and media content delivered by the dual-mode media server is not the same as that delivered by the master audio server, the master audio server controls the length and scheduling of spot blocks. Thus, in some embodiments, content delivered by the dual-mode server is synchronized to the master audio server, at least to the extent necessary for the beginning and end of spot blocks to coincide.

As illustrated by block 207, while operating in a synchronized mode, the dual-mode media server can make a check to determine whether a signal to start a spot block has been received from the master audio server. This provides at least one mechanism by which the master audio server exerts control to ensure synchronization of spot blocks and content delivered by the dual-mode media server. If no signal or command to begin a spot block is received from the master audio server, the dual-mode media server continues to deliver content for synchronized broadcast, as illustrated by block 203.

As illustrated by block 209, if the dual-mode media server receives a command or other signal to begin delivering a spot block for broadcast while in the synchronized mode, dual-mode media server response to the command by delivering a spot block for broadcast.

As illustrated by block 211, dual-mode media server can check to determine whether a change to independent mode is to be made. The determination of whether to switch to independent mode can be made on a number of different bases. For example, a hardcoded time to switch from synchronized mode to independent mode may be used, in which case dual-mode media server can switch modes at a predetermined time.

In other embodiments, a command from the master audio server may be received, or the station log used by the dual-mode media server may include a floating event. Such a floating event maybe a command or set of commands embedded or otherwise included in a station log, and configured to take effect upon the occurrence of a trigger event. The trigger event can include, for example, the start or completion of a particular spot block, the start or completion of a particular programming event, the broadcast of a particular media content item, or the like.

If no change to independent mode is to be made at this time, the dual-mode media server can continue to deliver content for synchronized broadcast, as illustrated by block 203.

As illustrated by block 213, if a change to independent mode is to be made, the dual-mode media server can execute an instruction to enter the independent mode. This instruction can, in at least one embodiment, take the form of a macro or other instruction or series of instructions designed to place the dual-mode media server into an independent mode.

During operation in the independent mode, the dual-mode media server can function independently of the master audio server. Thus, for example, spot blocks delivered for broadcast by the dual-mode media server need not be scheduled for the same time as spot blocks delivered by the master audio server. Furthermore, the spot blocks delivered by the master audio server and the dual-mode media server need not have the same length, or the same content.

Additionally, in at least some embodiments when the dual-mode media server is operating in an independent mode, the same content delivered for broadcast by the master audio server can be delivered for broadcast by the dual-mode media server, but in a different order or at different times. In various embodiments, the programming and media content delivered for broadcast by the master audio server and the dual-mode media server need not be the same. Furthermore, when operating in independent mode, the dual-mode media server can deliver spots and spot blocks unconstrained by a spot block schedule used by the master audio server.

As illustrated by block 215, upon executing the instruction to enter an independent mode, or as part of entering the independent mode, the dual-mode media server obtains a copy of the clock shell used by the master audio server. The clock shell can describe the types of media content to play during particular periods of time, but generally does not dictate specific media items or a particular order of play.

As illustrated by block 217, during operation in the independent mode, the dual-mode media server can operate in accordance with the copy of the clock shell obtained. Consequently, in at least some embodiments, the dual-mode media server can deliver for broadcast via one media channel, content similar, but not identical to, content being delivered by the master audio server for broadcast via a different media channel. Furthermore, in various embodiments, operating in accordance with the clock shell does not constrain the dual-mode media server to deliver spot blocks for broadcast in synchronization with spot blocks delivered by the master audio server.

In some embodiments, to facilitate content delivery by the dual-mode media server, voice track mappings from external locations that are mapped via an Internet protocol to the master station are duplicated to the dual-mode media server. Additionally, music log loading can be pointed to the same load folder used by the master station. In at least one embodiment, for local voice tracking, the master station is mapped via an Internet protocol to transmit the same tracks to the dual-mode media server.

As illustrated by block 219, the dual-mode media server can periodically synchronize its copy of the clock shell to a time marker. The time marker may, in some embodiments, occur every hour on the hour or the half hour, every one and a half hours, every 2 hours, or at other periods and times deemed appropriate. The clock shell being used by the master audio server is, in some embodiments, also being synchronized to a time marker, which may or may not be the same time marker used to synchronize the operation of the dual-mode media server. In at least one embodiment, the copy of the clock shell is synchronized with the clock shell used by the master audio server to ensure that a later change by the dual-mode media server from an independent mode to a synchronized mode can be achieved smoothly, without adversely affecting the consumer experience.

To further ensure a smooth transition, in some embodiments, during hours in which the dual-mode media server is scheduled to transition from independent mode back into synchronized mode, macros other than those that control rejoin, synchronization and block fill are avoided.

As illustrated by block 221, the dual-mode media server can check to determine whether or not to change from independent mode to synchronized mode. Such a check can be performed at a fixed time, or in response to a floating event, similar to the determination made with respect to changing to the independent mode. If the dual-mode media server determines that it is not yet time to switch into synchronized mode, it continues to deliver content according to the clock shell, as illustrated by block 217. If the dual-mode media server determines at block 221 that a change to synchronized mode should be made, and instruction to enter the synchronized mode can be executed as illustrated by block 205.

Although a particular embodiment of method 200 has been shown and described, various alterations to method 200 can be made upon consistent with the teachings set forth herein, without departing from the spirit and scope of the disclosure.

Figure 3:
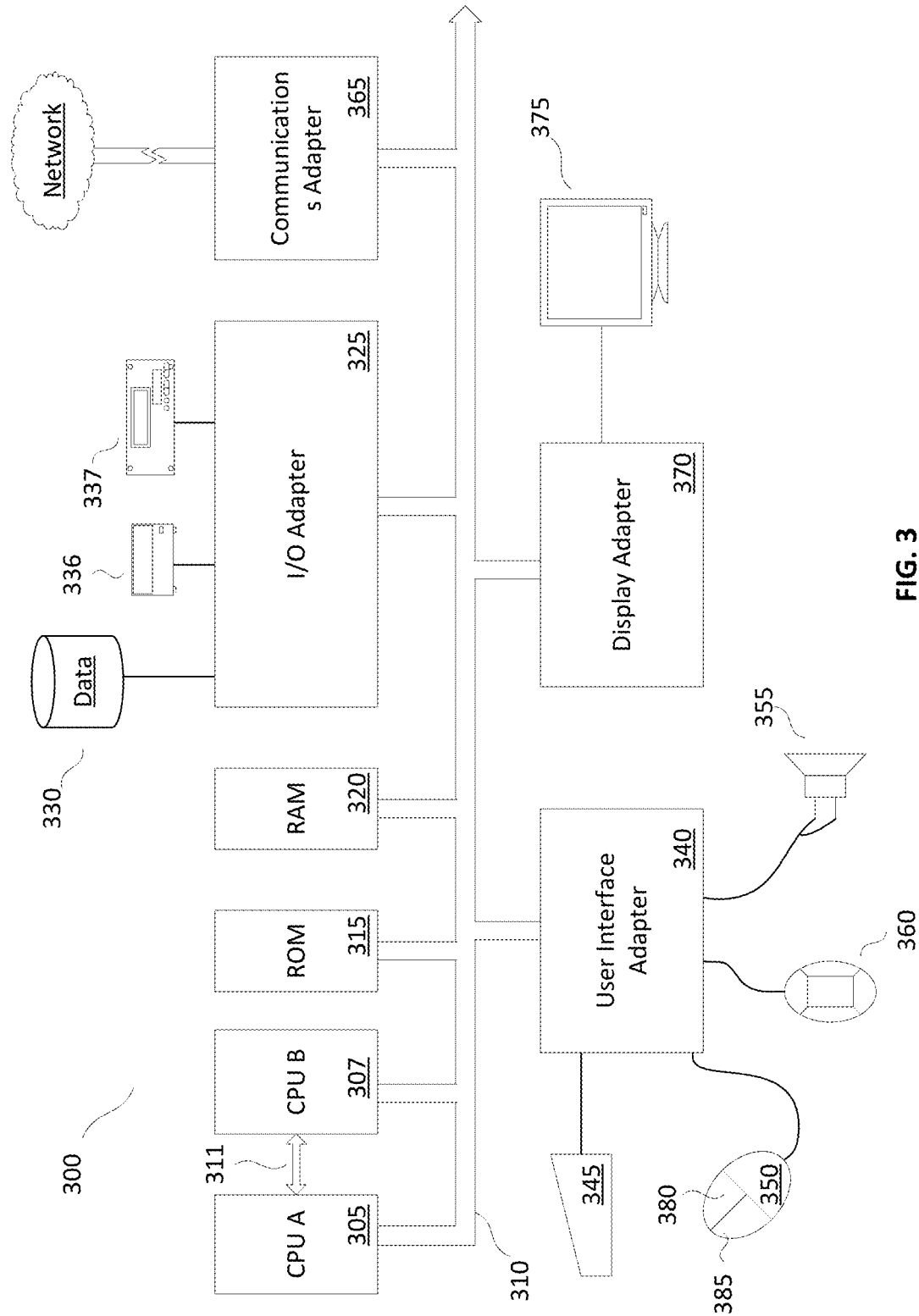
FIG. 3 is a high level block diagram of a processing system according to embodiments of the present disclosure.

Referring now to FIG. 3, a high-level block diagram of a processing system is illustrated and discussed. Processing system 300 includes one or more central processing units, such as CPU A 305 and CPU B 307, which may be conventional microprocessors interconnected with various other units via at least one system bus 310. CPU A 305 and CPU B 307 may be separate cores of an individual, multi-core processor, or individual processors connected via a specialized bus 311. In some embodiments, CPU A 305 or CPU B 307 may be a specialized processor, such as a graphics processor, other co-processor, or the like.

Processing system 300 includes random access memory (RAM) 320; read-only memory (ROM) 315, wherein the ROM 315 could also be erasable programmable read-only memory (EPROM) or electrically erasable programmable read-only memory (EEPROM); and input/output (I/O) adapter 325, for connecting peripheral devices such as disk units 330, optical drive 336, or tape drive 337 to system bus 310; a user interface adapter 340 for connecting keyboard 345, mouse 350, speaker 355, microphone 360, or other user interface devices to system bus 310; communications adapter 365 for connecting processing system 300 to an information network such as the Internet or any of various local area networks, wide area networks, telephone networks, or the like; and display adapter 370 for connecting system bus 310 to a display device such as monitor 375. Mouse 350 has a series of buttons 380, 385 and may be used to control a cursor shown on monitor 375.

It will be understood that processing system 300 may include other suitable data processing systems without departing from the scope of the present disclosure. For example, processing system 300 may include bulk storage and cache memories, which provide temporary storage of at least some program code in order to reduce the number of times code must be retrieved from bulk storage during execution.

Various disclosed embodiments can be implemented in hardware, software, or a combination containing both hardware and software elements. In one or more embodiments, the invention is implemented in software, which includes but is not limited to firmware, resident software, microcode, etc. Some embodiments may be realized as a computer program product, and may be implemented as a computer-usable or computer-readable medium embodying program code for use by, or in connection with, a computer, a processor, or other suitable instruction execution system.

For the purposes of this description, a computer-usable or computer readable medium can be any apparatus that can contain, store, communicate, or transport the program for use by or in connection with an instruction execution system, apparatus, or device. By way of example, and not limitation, computer readable media may comprise any of various types of computer storage media, including volatile and non-volatile, removable and non-removable media implemented in any suitable method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

Various embodiments have been described in which a media server is capable of operating part of the time in a synchronized mode, and part of the time in an independent mode. Other variations and modifications of the embodiments disclosed may be made based on the description provided, without departing from the scope of the invention as set forth in the following claims.

What is claimed is:

1. A system comprising:
an over-air media server coupled via a first communications network to an on-air broadcast chain, the over-air media server configured to:
obtain first media content, wherein the first media content includes external content stored in a location external to the over-air media server;
deliver the first media content for broadcast via the on-air broadcast chain;
a streaming media server coupled to the over-air media server, and coupled to a streaming broadcast chain via a second communications network, the streaming media server configured to:
operate in a synchronized mode during a first period of time, wherein during operation in the synchronized mode the streaming media server delivers second media content to the streaming broadcast chain under control of the over-air media server, wherein the second media content includes at least a portion of the first media content;
transition from operating in the synchronized mode to operating in an independent mode, wherein transitioning to operating in the independent mode includes mapping a mapped location of the external content to the streaming media server; and
operate in the independent mode during a second period of time, wherein during operation in the independent mode the streaming media server is further configured to:
obtain the second media content, wherein obtaining the second media content includes obtaining the external content from the mapped location; and
deliver the second media content to the streaming broadcast chain independent of control by over-air media server.

2. The system of claim 1, wherein:
the location external to the over-air media server includes a folder mapped using an Internet protocol.

3. The system of claim 1, wherein:
the external content includes voice tracks.

4. The system of claim 1, wherein:
the external content includes music logs stored in a load folder.

5. The system of claim 1, wherein the streaming media server is further configured to:
transition from operating in the synchronized mode to operating in an independent mode in response to a floating even included in a station log.

6. The system of claim 1, wherein the streaming media server is further configured to:
transition from operating in the synchronized mode to operating in an independent mode in response to occurrence of a programming event.

7. The system of claim 1, wherein the streaming media server is further configured to:
obtain a copy of a clock shell used by the over-air media server as part of the transition from in the synchronized mode to operating in an independent mode.

8. A method comprising:
at an over-air media server coupled via a first communications network to an on-air broadcast chain:
obtaining first media content, wherein the first media content includes external content stored in a location external to the over-air media server;
delivering the first media content for broadcast via the on-air broadcast chain;

at a streaming media server coupled to the over-air media server, and coupled to a streaming broadcast chain via a second communications network:
  operating in a synchronized mode during a first period of time, wherein during operation in the synchronized mode the streaming media server delivers second media content to the streaming broadcast chain under control of the over-air media server, wherein the second media content includes at least a portion of the first media content;
  transitioning from operating in the synchronized mode to operating in an independent mode, wherein transitioning to operating in the independent mode includes mapping a mapped location of the external content to the streaming media server; and
  operating in the independent mode during a second period of time, wherein operating in the independent mode includes:
    obtaining the second media content, wherein obtaining the second media content includes obtaining the external content from the mapped location; and
    delivering the second media content to the streaming broadcast chain independent of control by over-air media server.

9. The method of claim 8, wherein:
the location external to the over-air media server includes a folder mapped using an Internet protocol.

10. The method of claim 8, wherein:
the external content includes voice tracks.

11. The method of claim 8, wherein:
the external content includes music logs stored in a load folder.

12. The method of claim 8, wherein transitioning from operating in the synchronized mode to operating in an independent mode includes:
  transitioning in response to a floating even included in a station log.

13. The method of claim 8, wherein transitioning from operating in the synchronized mode to operating in an independent mode includes:
  transitioning in response to occurrence of a programming event.

14. The method of claim 8, wherein transitioning from operating in the synchronized mode to operating in an independent mode includes:
  obtaining a copy of a clock shell used by the over-air media server.

15. A streaming media server comprising:
  a processor;
  memory coupled to the processor;
  at least one communications interface coupled to the processor and the memory, the communications interface configured to:
    couple the streaming media server to an over-air media server, the over-air media server configured to obtain first media content including external content stored in a location external to the over-air media server, and to deliver the first media content for broadcast via an on-air broadcast chain;
    couple the streaming media server to a streaming broadcast chain;
  the processor programmed to:
    configure the streaming media server to operate in a synchronized mode during a first period of time, wherein during operation in the synchronized mode the streaming media server delivers second media content to the streaming broadcast chain under control of the over-air media server, wherein the second media content includes at least a portion of the first media content;
    configure the streaming media server to transition from operating in the synchronized mode to operating in an independent mode, wherein transitioning to operating in the independent mode includes mapping a mapped location of the external content to the streaming media server; and
    configure the streaming media server to operate in the independent mode during a second period of time, wherein during operation in the independent mode the streaming media server is further configured to:
      obtain the second media content, wherein obtaining the second media content includes obtaining the external content from the mapped location; and
      deliver the second media content to the streaming broadcast chain independent of control by over-air media server.

16. The streaming media server of claim 15, wherein:
the location external to the over-air media server includes a folder mapped using an Internet protocol.

17. The streaming media server of claim 15, wherein:
the external content includes voice tracks.

18. The streaming media server of claim 15, wherein:
the external content includes music logs stored in a load folder.

19. The streaming media server of claim 15, wherein the streaming media server is further configured to:
  transition from operating in the synchronized mode to operating in an independent mode in response to a floating even included in a station log.

20. The streaming media server of claim 15, wherein the streaming media server is further configured to:
  transition from operating in the synchronized mode to operating in an independent mode in response to occurrence of a programming event.

* * * * *